(12) United States Patent
Yamamoto

(10) Patent No.: US 12,513,282 B2
(45) Date of Patent: Dec. 30, 2025

(54) LINE-OF-SIGHT DETECTING DEVICE

(71) Applicant: CANON KABUSHIKI KAISHA, Tokyo (JP)

(72) Inventor: Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 18/356,989

(22) Filed: Jul. 21, 2023

(65) Prior Publication Data

US 2025/0030829 A1    Jan. 23, 2025

Related U.S. Application Data

(63) Continuation of application No. PCT/JP2021/048575, filed on Dec. 27, 2021.

(30) Foreign Application Priority Data

Jan. 29, 2021  (JP) ................................ 2021-013827

(51) Int. Cl.
*H04N 13/00* (2018.01)
*H04N 13/128* (2018.01)
*H04N 13/344* (2018.01)
*H04N 13/383* (2018.01)
*H04N 13/398* (2018.01)

(52) U.S. Cl.
CPC ......... *H04N 13/383* (2018.05); *H04N 13/128* (2018.05); *H04N 13/344* (2018.05); *H04N 13/398* (2018.05)

(58) Field of Classification Search
CPC .. H04N 13/383; H04N 13/128; H04N 13/344; H04N 13/398

USPC ............................................ 348/53
See application file for complete search history.

(56) References Cited

U.S. PATENT DOCUMENTS

| 12,217,541 | B2 * | 2/2025 | Mori | G06V 40/18 |
|---|---|---|---|---|
| 2015/0130703 | A1 | 5/2015 | Ghajar | |
| 2017/0344110 | A1 * | 11/2017 | Yoshioka | G06V 40/193 |
| 2018/0150995 | A1 * | 5/2018 | Kaneko | G06T 15/506 |
| 2020/0120322 | A1 * | 4/2020 | Ogasawara | H04N 13/122 |
| 2020/0150759 | A1 * | 5/2020 | Zhang | G06F 3/017 |
| 2021/0049760 | A1 * | 2/2021 | Yan | G06V 40/171 |

FOREIGN PATENT DOCUMENTS

| JP | 2004008323 A | 1/2004 |
|---|---|---|
| JP | 2007034628 A | 2/2007 |
| JP | 2020504959 A | 2/2020 |
| WO | 2020016970 A1 | 1/2020 |
| WO | 2020100422 A1 | 5/2020 |

\* cited by examiner

*Primary Examiner* — Gims S Philippe
(74) *Attorney, Agent, or Firm* — Canon U.S.A., Inc., IP Division

(57) ABSTRACT

A line-of-sight detecting device includes at least one memory and at least one processor which function as: a line-of-sight detecting unit configured to detect each of lines of sight of a right eye and a left eye of a user; a gazing point detecting unit configured to detect a gazing point on a basis of the line of sight of at least a dominant eye among the right eye and the left eye; and a control unit configured to control processing based on the gazing point, on a basis of a fluctuation amount of the line of sight of at least a non-dominant eye among the right eye and the left eye.

6 Claims, 8 Drawing Sheets

FIG. 1
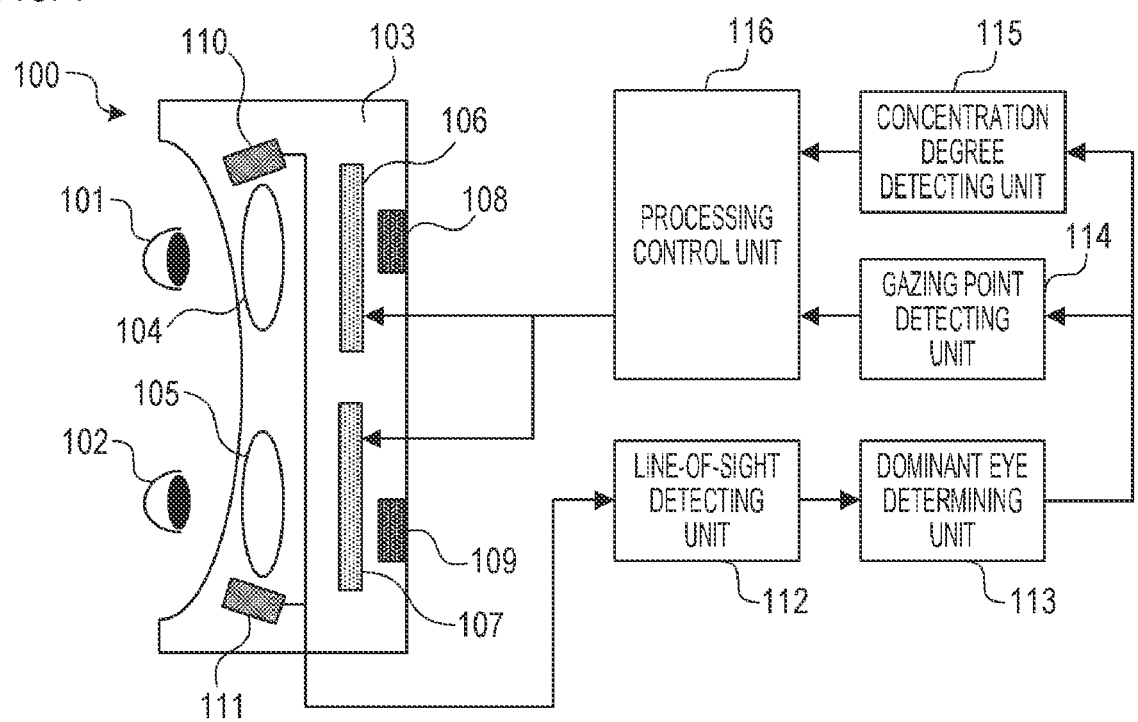
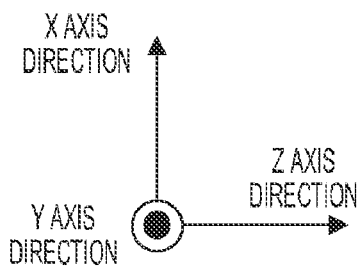

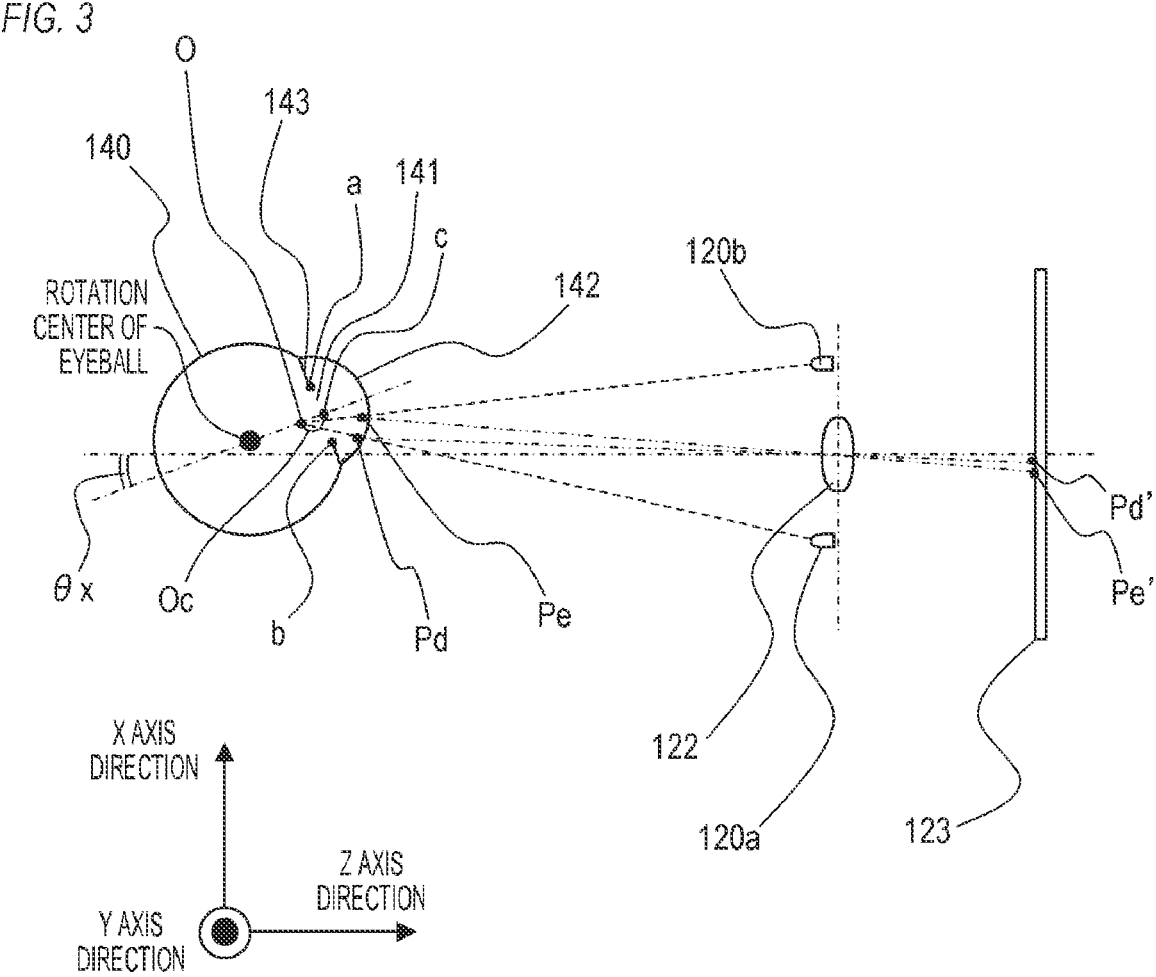

LINE-OF-SIGHT DETECTING DEVICE

CROSS-REFERENCE TO RELATED APPLICATIONS

This application is a Continuation of International Patent Application No. PCT/JP2021/048575, filed Dec. 27, 2021, which claims the benefit of Japanese Patent Application No. 2021-013827, filed Jan. 29, 2021, which is hereby incorporated by reference herein in its entirety.

BACKGROUND OF THE INVENTION

Field of the Invention

The present invention relates to a line-of-sight detecting device.

Background Art

There are proposed various techniques of detecting (estimating) a line of sight (line-of-sight direction; line-of-sight position), and performing processing that is based on a gazing point (gazing position). For example, PLT 1 proposes a technique of specifying an object (recognizing the object intended by a photographer) based on information on a line-of-sight position of the photographer looking through a finder, and controlling the focus on the object.

The techniques of performing processing that is based on a gazing point are used for camera control, and, in addition, for example, xR (such as Virtual Reality (VR), Augmented Reality (AR), Mixed Reality (MR), and Substitutional Reality (SR)) and the like. For example, PLT 2 proposes a technique of determining which part of a video a user is gazing at in a Head Mount Display (HMD), making the video clear near a gazing point, and blurring a video in an area apart from the gazing point. This processing is processing of controlling (changing) a depth of field using the gazing point as a reference in a pseudo manner, and this processing makes it possible to enhance a user's sense of immersion and provide a more comfortable VR experience.

Detection of a line of sight that uses both eyes is proposed as detection of a line of sight by the HMD or the like. For example, a method for detecting a line of sight of each of a right eye and a left eye, a method for determining a dominant eye and a non-dominant eye and emphasizing the dominant eye, and the like are proposed. PTL 3 proposes a technique of determining a user's dominant eye, and adjusting a position of a video based on information on the dominant eye.

Although a method for determining a gazing point using line-of-sight information on a dominant eye is proposed, a conventional technique performs processing that does not depend on a user's intention (how the user looks at a gazing point) as processing that is based on the gazing point, and therefore the performed processing is not preferable for the user. Although, for example, the technique (of controlling the depth of field whose reference is the gazing point) disclosed in PTL 2 performs control that is preferable for the user who wants to have a higher sense of immersion, this control is not preferable for a user who wants to capture an entire video without having a sense of immersion.

The present invention provides a technique that can suitably perform processing that is based on a gazing point.

CITATION LIST

Patent Literature

PTL 1 Japanese Patent Laid-Open No. 2004-8323
PTL 2 Japanese Patent Laid-Open No. 2020-504959
PTL 3 Japanese Patent Laid-Open No. 2007-34628

SUMMARY OF THE INVENTION

The present invention in its first aspect provides a line-of-sight detecting device including at least one memory and at least one processor which function as: a line-of-sight detecting unit configured to detect each of lines of sight of a right eye and a left eye of a user; a gazing point detecting unit configured to detect a gazing point on a basis of the line of sight of at least a dominant eye among the right eye and the left eye; and a control unit configured to control processing based on the gazing point, on a basis of a fluctuation amount of the line of sight of at least a non-dominant eye among the right eye and the left eye.

The present invention in its second aspect provides a control method including: detecting each of lines of sight of a right eye and a left eye of a user; detecting a gazing point on a basis of the line of sight of at least a dominant eye among the right eye and the left eye; and controlling processing based on the gazing point, on a basis of a fluctuation amount of the line of sight of at least a non-dominant eye among the right eye and the left eye.

The present invention in its third aspect provides a non-transitory computer readable medium that stores a program, wherein the program causes a computer to execute a control method including: detecting each of lines of sight of a right eye and a left eye of a user; detecting a gazing point on a basis of the line of sight of at least a dominant eye among the right eye and the left eye; and controlling processing based on the gazing point, on a basis of a fluctuation amount of the line of sight of at least a non-dominant eye among the right eye and the left eye.

Further features of the present invention will become apparent from the following description of exemplary embodiments with reference to the attached drawings.

BRIEF DESCRIPTION OF THE DRAWINGS

FIG. 1 is a view illustrating a configuration of an HMD according to embodiment 1;

FIG. 3 is a view for explaining a principal of a line-of-sight detecting method according to embodiment 1;

DESCRIPTION OF THE EMBODIMENTS

Embodiment 1

Figure 2:
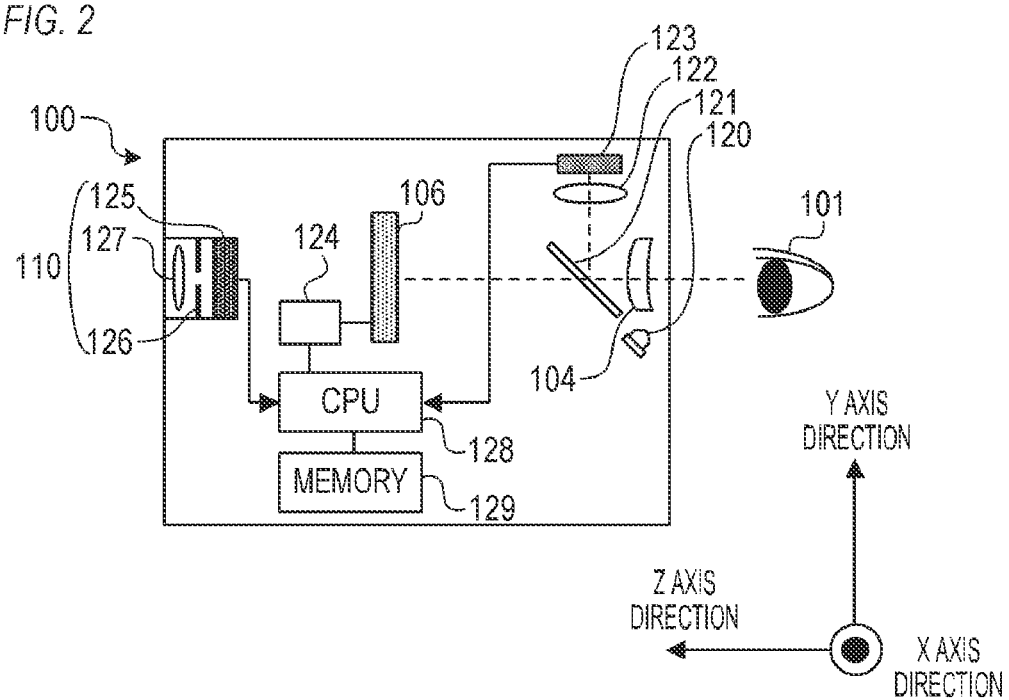
FIG. 2 is a view illustrating the configuration of the HMD according to embodiment 1.

Hereinafter, embodiment 1 of the present invention will be described with reference to FIGS. 1 to 7A and 7B.

Description of Configuration

FIG. 1 is a schematic view of a configuration of a Head Mount Display (HMD) 100 that is an example of a display device including a line-of-sight detecting device according to embodiment 1. The HMD 100 is the display device that a user's head is equipped with to use. FIG. 1 includes on the left side a configuration diagram illustrating the configuration of the HMD 100 seen from a side of the top of the user's head equipped with the HMD 100, and includes on the right side a block diagram illustrating a functional configuration of the line-of-sight detecting device. Note that that the HMD 100 can be regarded as an example of the line-of-sight detecting device that includes a display unit.

The user is equipped with a housing 103 of the HMD 100, and can see a video displayed on a left display 106 with a left eye 101 through a left ocular lens 104, and see a video displayed on a right display 107 with a right eye 102 through a right ocular lens 105. Equipment of the HMD 100 includes, for example, non-transmissive equipment and transmissive equipment. At a time of non-transmissive equipment, a display (the left display 106 and the right display 107) displays, for example, videos stored inside the HMD 100, videos acquired from an outside by the HMD 100, and the like, and, more specifically, previously captured videos and game videos. At a time of transmissive equipment, a live video (substantially real-time video) captured by a left camera 108 is displayed on the left display 106, and a live video captured by a right camera 109 is displayed on the right display 107. A video obtained by fusing (combining) a live video and another video may be displayed, or a live video and another video may be appropriately switched, and displayed on the display. A left line-of-sight detector 110 detects (estimates) a line of sight (line-of-sight direction; line-of-sight position) of the left eye 101 of the user equipped with the HMD 100, and a right line-of-sight detector 111 detects a line of sight of the right eye 102 of the user. A line-of-sight detecting method will be described later.

Next, each function unit of the line-of-sight detecting device will be described. The line-of-sight detecting unit 112 detects each line-of-sight of the left eye 101 and the right eye 102 of the user. More specifically, a line-of-sight detecting unit 112 acquires a line-of-sight detection result (line-of-sight information) from each of the left line-of-sight detector 110 and the right line-of-sight detector 111. A dominant eye determining unit 113 determines which one of the left eye 101 and the right eye 102 a dominant eye is, and which one thereof a non-dominant eye is (which one of line-of-sight information on the left eye 101 and line-of-sight information on the right eye 102 line-of-sight information on the dominant eye is, and which one thereof line-of-sight information on the non-dominant eye is).

A gazing point detecting unit 114 detects a gazing point (gazing position) based on the line-of-sight information on at least the dominant eye among the left eye 101 and the right eye 102. A concentration degree detecting unit 115 detects (determines) a fluctuation amount of the user's line of sight based on the line-of-sight information on at least the non-dominant eye among the left eye 101 and the right eye 102, and detects (determines) the degree of user's concentration according to the fluctuation amount.

A processing control unit 116 performs processing that is based on the gazing point detected by the gazing point detecting unit 114. In this case, the processing control unit 116 controls processing that is based on the gazing point, based on the degree of concentration (the fluctuation amount of the line of sight) detected by the concentration degree detecting unit 115. For example, the processing control unit 116 adjusts a control amount of a specific function that works for the display (the left display 106 and the right display 107) based on the degree of concentration.

The user looks at the gazing point in various ways, and there are not only a case where the user aimlessly looks at the gazing point, but also a case where the user is intensively looking at the gazing point with some intention. If it is possible to automatically determine a difference in how the user looks at the gazing point, and automatically control processing (the processing that is based on the gazing point) according to a determination result, it is possible to suitably perform processing that is based on the gazing point. For example, a user who wants to have a higher sense of immersion tends to intensively look at a gazing point, so that it is possible to suitably enhance the sense of immersion by performing processing for enhancing the sense of immersion only when the degree of user's concentration is high. A user who wants to perform an operation (of, for example, pushing a button icon) on a GUI also tends to intensively look at a gazing point. Consequently, by activating an assist function of assisting the operation on the GUI only when the degree of user's concentration is high, it is possible to improve user friendliness (it is possible to suppress a decrease in the user friendliness caused by providing the assist function to a user who does not need assistance). Furthermore, the user does not need to make settings (such as switching of the processing that is based on the gazing point), so that it is possible to further enhance the sense of immersion, and further improve user friendliness.

Conventionally, it has been reported that, when a user is aimlessly looking at a target, only a line of sight of a dominant eye accurately faces a direction of the target, and a line of sight of a non-dominant eye relatively significantly fluctuates (shakes). Furthermore, it has been reported that, when a user performs work (of, for example, pushing a button icon) that requires depth information, that is, when the user intensively looks at the target, a non-dominant eye also has a smaller fluctuation amount of a line of sight, and faces the direction of the target.

Hence, in embodiment 1, the gazing point is detected based on the line-of-sight information on at least the dominant eye, and the fluctuation amount (degree of concentration) of the user's line of sight is detected based on the line of sight information on at least the non-dominant eye. Furthermore, the processing based on the gazing point is controlled based on the detected fluctuation amount (degree of concentration). By so doing, it is possible to suitably perform processing that is based on the gazing point as described above.

FIG. 2 is a cross-sectional view illustrating the HMD 100 cut along a YZ plane formed by the Y axis and the Z axis illustrated in FIG. 1, and is a schematic view of the configuration of the HMD 100. FIG. 2 illustrates the configuration of the HMD 100 in more detail compared to FIG. 1. In FIG. 2, to illustrate the cross section seen from the left eye side of the user equipped with the HMD 100, the right ocular lens 105, the right display 107, the right camera 109, and the right line-of-sight detector 111 are omitted. The right ocular lens 105 employs the same configuration as that of the left ocular lens 104, the right display 107 employs the same configuration as that of the left display 106, the right camera 109 employs the same configuration as that of the left camera 108, and the right line-of-sight detector 111 employs the same configuration as that of the left line-of-sight detector 110.

In the HMD 100, a CPU 128 controls (each of) all units of the HMD 100. A memory 129 stores videos (video information) to be displayed on the display (the left display 106 and the right display 107), programs to be executed by the CPU 128, and the like. For example, the CPU 128 executes the programs stored in the memory 129 to implement functions of the line-of-sight detecting unit 112, the dominant eye determining unit 113, the gazing point detecting unit 114, the concentration degree detecting unit 115, and the processing control unit 116.

The left display 106 is a display unit that displays videos, and is, for example, a combination of a liquid crystal panel and a backlight, an organic EL panel, and the like. A display driving circuit 124 drives the left display 106 (and the right display 107). The left ocular lens 104 is an ocular lens for observing the video displayed on the left display 106.

The left camera 108 is a camera that images an outside at a time of transmissive equipment of the HMD 100, and includes a camera imaging element 125, a diaphragm mechanism 126, and a focus mechanism 127. The memory 129 has a function of storing imaging signals (captured images) from the camera imaging element 125.

The left line-of-sight detector 110 includes a light source 120, a light splitter 121, a light reception lens 122, and an eye imaging element 123. The light source 120 is a light source that illuminates the left eye 101 for detecting the line of sight. For example, the light source 120 is an infrared light-emitting diode that emits infrared light that the user does not sense, and is arranged around the left ocular lens 104. The number of the light sources 120 is not limited in particular. An optical image of the illuminated left eye 101 (eyeball image; an image formed by reflection light emitted from the light source 120 and reflected by the left eye 101) transmits through the left ocular lens 104, and is reflected by the light splitter 121. Furthermore, the eyeball image is formed by the light reception lens 122 on the eye imaging element 123 formed by two-dimensionally aligning rows of photoelectric elements such as CMOSs. The eyeball image includes a reflection image (corneal reflection image; Purkinje image) formed by corneal reflection of light from the light source 120. The light reception lens 122 brings the pupil of the left eye 101 and the eye imaging element 123 into a conjugate image forming relationship. According to a predetermined algorithm described later, the line of sight of the left eye 101 is detected based on the positional relationship between the pupil (pupil image) in the eyeball image formed on the eye imaging element 123, and the corneal reflection image. The memory 129 has a function of storing imaging signals from the eye imaging element 123, and a function of storing line-of-sight correction data.

Description of Line-of-Sight Detecting Operation

Figure 4A:
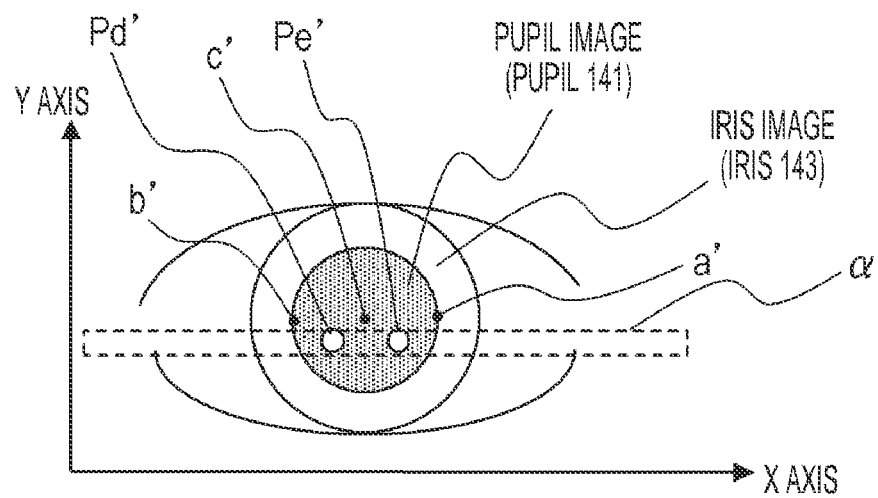
FIG. 4A is a view illustrating an eye image according to embodiment 1.
Figure 4B:
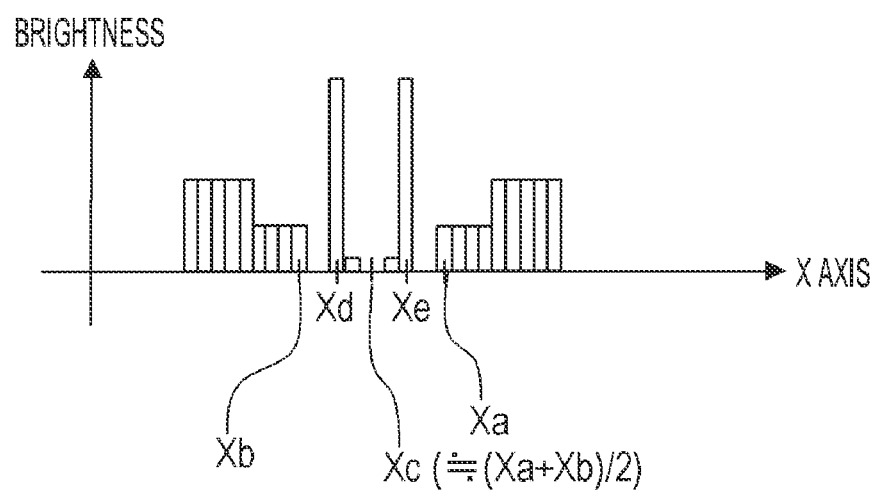
FIG. 4B is a view illustrating a brightness distribution of the eye image according to embodiment 1.
Figure 5:
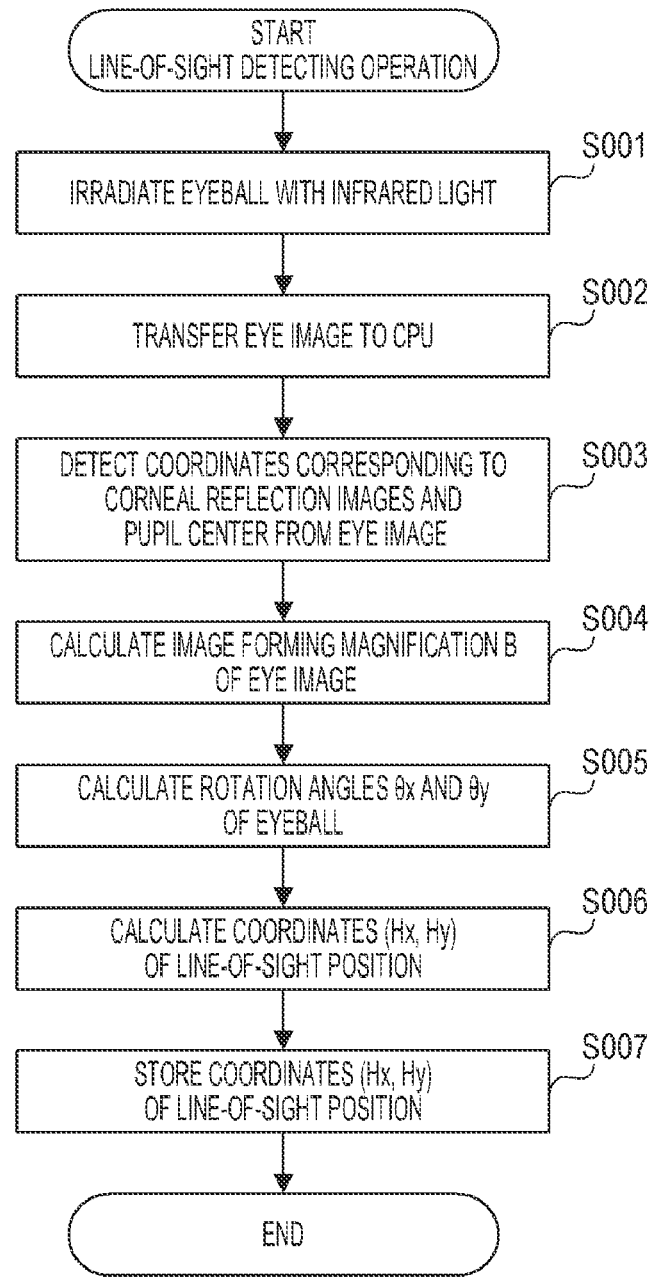
FIG. 5 is a flowchart of a line-of-sight detecting operation according to embodiment 1.

The line-of-sight detecting method will be described with reference to FIGS. 3, 4A, 4B, and 5. The line of sight of the left eye 101 and the line of sight of the right eye 102 are detected by a following method. FIG. 3 is a view for describing a principal of the line-of-sight detecting method, and is a schematic view of an optical system for detecting a line of sight. As illustrated in FIG. 3, light sources 120a and 120b are disposed substantially symmetrically with respect to the optical axis of the light reception lens 122, and illuminate a user's eye 140 (the left eye 101 or the right eye 102). Part of light emitted from the light sources 120a and 120b and reflected by the eye 140 is condensed on the eye imaging element 123 by the light reception lens 122. FIG. 4A is a schematic view illustrating an eye image captured by the eye imaging element 123 (an eyeball image projected on the eye imaging element 123), and FIG. 4B is a view illustrating an output intensity of the CMOS in the eye imaging element 123. FIG. 5 is a schematic flowchart of the line-of-sight detecting operation.

When the line-of-sight detecting operation is started, the light sources 120a and 120b emit infrared light toward the user's eye 140 in step S001 in FIG. 5. The user's eyeball image illuminated by the infrared light is formed on the eye imaging element 123 through the light reception lens 122, and is photoelectrically converted by the eye imaging element 123. Consequently, it is possible to obtain an electric signal of the eye image that can be processed.

In step S002, the line-of-sight detector (the left line-of-sight detector 110 or the right line-of-sight detector 111) sends the eye image (an eye image signal; an electric signal of an eye image) obtained from the eye imaging element 123 to the CPU 128.

In step S003, the CPU 128 obtains coordinates of corneal reflection images Pd and Pe of the light sources 120a and 120b and a point corresponding to a pupil center c from the eye image obtained in step S002.

The infrared light emitted from the light sources 120a and 120b illustrates a cornea 142 of the user's eye 140. At this time, the corneal reflection images Pd and Pe formed by part of the infrared light reflected on the surface of the cornea 142 are condensed by the light reception lens 122, are formed on the eye imaging element 123, and become corneal reflection images Pd' and Pe' in the eye image. Similarly, light fluxes from ends a and b of the pupil 141 are also formed on the eye imaging element 123, and become pupil end images a' and b' in the eye image.

FIG. 4B illustrates brightness information (brightness distribution) of an area a in the eye image in FIG. 4A. FIG. 4B illustrates a horizontal direction of an eye image as an X axis direction and a vertical direction as a Y axis direction, and illustrates a brightness distribution in the X axis direction. In embodiment 1, coordinates in the X axis direction (horizontal direction) of the corneal reflection images Pd' and Pe' are Xd and Xe, and coordinates in the X axis direction of the pupil end images a' and b' are Xa and Xb. As illustrated in FIG. 4B, brightness of an extremely high level can be obtained at the X coordinates Xd and Xe of the corneal reflection images Pd' and Pe'. In an area from the X coordinates Xa to the X coordinates Xb corresponding to an area of the pupil 141 (an area of a pupil image obtained when the light flux from the pupil 141 is formed on the eye imaging element 123), brightness of an extremely low level can be obtained except at the X coordinates Xd and Xe. Furthermore, in an area of an iris 143 on the outer side of the pupil 141 (an area of an iris image on the outer side of the pupil image obtained when a light flux from the iris 143 is formed), middle brightness of the two types of brightness can be obtained. More specifically, in an area in which the X coordinates (the coordinates in the X axis direction) are smaller than the X coordinates Xa, and an area in which the X coordinates are larger than the X coordinates Xb, the middle brightness of the above two types of brightness can be obtained.

It is possible to obtain the X coordinates Xd and Xe of the corneal reflection images Pd' and Pe', and the X coordinates Xa and Xb of the pupil end images a' and b' from the brightness distribution illustrated in FIG. 4B. More specifically, it is possible to obtain coordinates of extremely high brightness as the coordinates of the corneal reflection images Pd' and Pe', and obtain coordinates of extremely low brightness as the coordinates of the pupil end images a' and b'. Furthermore, in a case where a rotation angle θx of the optical axis of the eye 140 with respect to the optical axis of the light reception lens 122 is small, X coordinates Xc of a pupil center mage c' (the center of the pupil image) obtained when a light flux from the pupil center c is formed on the eye imaging element 123 can be expressed by Xc≈(Xa+Xb)/2. That is, the X coordinates Xc of the pupil center image c' can be calculated from the X coordinates Xa and Xb of the pupil end images a' and b'. In this way, it is possible to estimate the coordinates of the corneal reflection images Pd' and Pe', and the coordinates of the pupil center image c'.

In step S004, the CPU 128 calculates an image forming magnification β of the eyeball image. The image forming magnification β is a magnification determined according to a position of the eye 140 with respect to the light reception lens 122, and can be obtained by using a function of an interval (Xd−Xe) of the corneal reflection images Pd' and Pe'.

In step S005, the CPU 128 calculates a rotation angle of the optical axis of the eye 140 with respect to the optical axis of the light reception lens 122. X coordinates of a midpoint of the corneal reflection image Pd and the corneal reflection image Pe, and X coordinates at a curvature center O of the cornea 142 substantially match. Consequently, in a case where a standard distance from the curvature center O of the cornea 142 to the center c of the pupil 141 is Oc, the rotation angle θx of the eye 140 on a Z-X plane (a plane vertical to the Y axis) can be calculated according to equation 1. A rotation angle θy of the eye 140 on a Z-Y plane (a plane vertical to the X axis) can be also calculated by the same method as the calculation method for calculating the rotation angle θx.

$$\beta \times Oc \times \mathrm{SIN}\theta x \approx \{Xd + Xe)/2\} - Xc \quad \text{(Equation 1)}$$

In step S006, the CPU 128 obtains (estimates) a line-of-sight position of the user (a position that a line of sight gazes at; a position that the user is looking at) on a display surface of the display (the left display 106 or the right display 107) by using the rotation angles θx and θy calculated in step S005. In a case where coordinates (Hx, Hy) of the line-of-sight position are coordinates corresponding to the pupil center c, the coordinates (Hx, Hy) of the line-of-sight position can be calculated by following equations 2 and 3.

$$Hx = m \times (Ax \times \theta x + Bx) \quad \text{(Equation 2)}$$
$$Hy = m \times (Ay \times \theta y + By) \quad \text{(Equation 3)}$$

A parameter m in equations 2 and 3 is a constant determined according to a configuration of an optical system (such as the light reception lens 122), and is a conversion coefficient for converting the rotation angles θx and θy into the coordinates corresponding to the pupil center c on the display surface of the display. The parameter m is determined in advance and is stored in the memory 129. Parameters Ax, Bx, Ay, and By are line-of-sight correction parameters for correcting an individual difference of a line of sight, and is obtained by performing calibration work. The parameters Ax, Bx, Ay, and By are stored in the memory 129 before the line-of-sight detecting operation starts.

In step S007, the CPU 128 stores the coordinates (Hx, Hy) of the line-of-sight position in the memory 129, and ends the line-of-sight detecting operation.

Note that, although the line-of-sight detecting method that uses the corneal reflection images of the light sources 120a and 120b has been described, the line-of-sight detecting method is not limited to this, and a line of sight may be detected by any method as long as the line-of-sight detecting method is the method that detects a rotation angle of the eye from an eye image, that is, the method that uses the eye image.

Description of Controlling Operation of Gazing Point Processing

Figure 6:
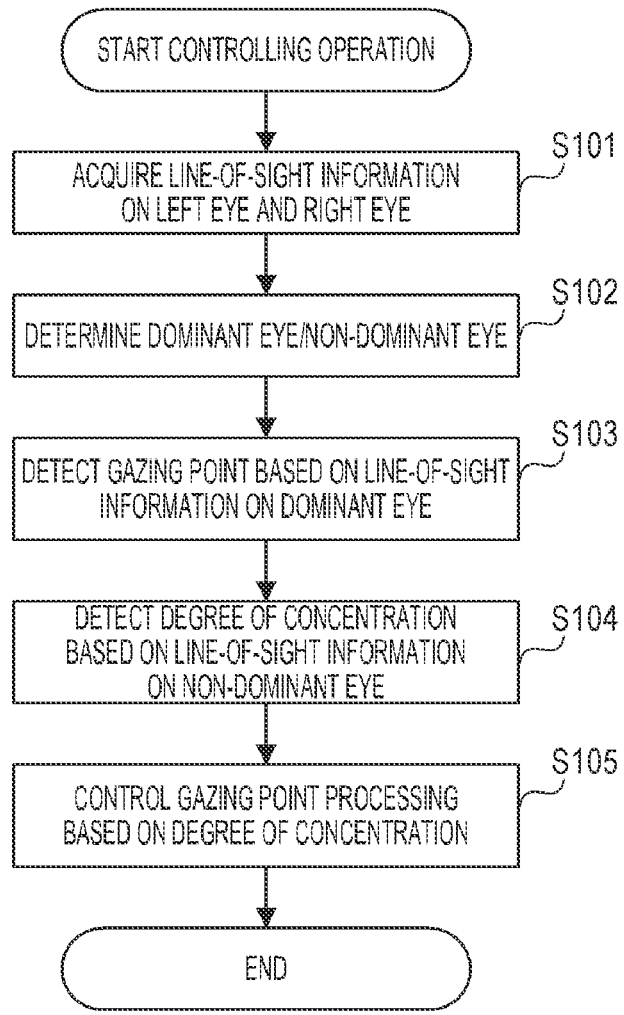
FIG. 6 is a flowchart illustrating a controlling operation of gazing point processing according to embodiment 1.
Figure 7A:
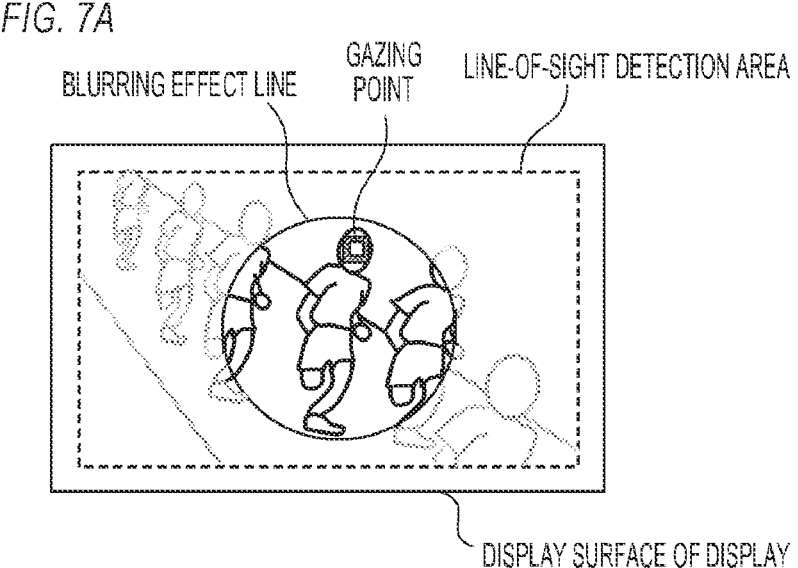
FIGS. 7A and 7B are views for explaining gazing point processing according to embodiment 1.
Figure 7B:
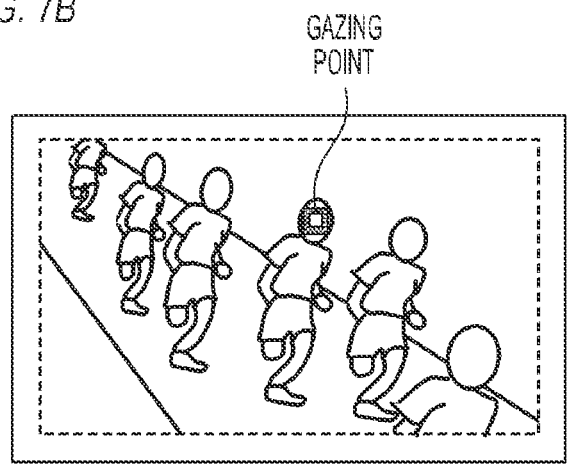

A controlling operation of controlling gazing point processing (processing that is based on a gazing point) will be described with reference to FIGS. 6, 7A, and 7B. FIG. 6 is a schematic flowchart of the controlling operation of the gazing point processing. FIGS. 7A and 7B are schematic views of display of the display (the left display 106 and the right display 107).

When the controlling operation is started, in step S101, the line-of-sight detecting unit 112 acquires the line-of-sight information (a detection result of the line of sight) of the left eye 101 from the left line-of-sight detector 110, and acquires the line-of-sight information on the right eye 102 from the right line-of-sight detector 111. The line-of-sight detecting unit 112 outputs (transmits) the acquired line-of-sight information to the dominant eye determining unit 113. The method of the left line-of-sight detector 110 and the right line-of-sight detector 111 for detecting lines of sight is as described above.

In step S102, the dominant eye determining unit 113 determines which one of the left eye 101 and the right eye 102 the dominant eye is, and which one thereof the non-dominant eye is (which one of the line-of-sight information on the left eye 101 and the line-of-sight information on the right eye 102 the line-of-sight information on the dominant eye is, and which one thereof the line-of-sight information on the non-dominant eye is). The dominant eye determining unit 113 outputs a determination result of the dominant eye/the non-dominant eye, and the line-of-sight information (the line-of-sight information on the left eye 101 and the right eye 102) acquired by the line-of-sight detecting unit 112 to the gazing point detecting unit 114 and the concentration degree detecting unit 115. The dominant eye determining unit 113 may output the line-of-sight information taking the determination result into account without outputting the determination result of the dominant eye/the non-dominant eye. For example, the line-of-sight information on the dominant eye may be output to the gazing point detecting unit 114, and the line-of-sight information on the non-dominant eye may be output to the concentration degree detecting unit 115.

Most people have dominant eyes, and a distance between a line-of-sight position of the dominant eye and a position of a target that a user wants to look at tends to become shorter than a distance between a line-of-sight position of the non-dominant eye and the position of the target. Generally, the non-dominant eye directs the line of sight to the vicinity of the target to feel an accurate perspective and depth (the line of sight of the non-dominant eye fluctuates near the target). A fluctuation amount (fluctuation range) of the line of sight of the non-dominant eye is relatively large, and there may be also a case where it is not possible to accurately specify where the user is looking at based on the line of sight of the non-dominant eye alone. As described above, the line of sight detected from the non-dominant eye does not necessarily match with a line of sight intended by the user in many cases, and it is known that accuracy of detection of lines of sight of non-dominant eyes is not high.

The dominant eye determining unit 113 determines as the dominant eye, for example, one of the left eye 101 and the right eye 102 having a less shift amount (a chronological shift amount) between a target prepared to attract a gaze and the detected line-of-sight position, and determine the other eye having a larger shift amount as the non-dominant eye. The dominant eye determining unit 113 may acquire for each one of the left eye 101 and the right eye 102 a distance from the inner corner of the eye to the pupil of the user who is looking at the target, and determine the dominant eye and the non-dominant eye based on the acquired distances. Known techniques can be used to determine the dominant eye/the non-dominant eye. The user may register in advance which one of the left eye 101 and the right eye 102 the dominant eye is, and which one thereof the non-dominant eye is. In this case, the dominant eye determining unit 113 may determine which one of the left eye 101 and the right eye 102 the dominant eye is, and which one thereof the non-dominant eye is based on registered information on the dominant eye/the non-dominant eye.

In step S103, the gazing point detecting unit 114 detects a gazing point based on the line-of-sight information on at least the dominant eye among the left eye 101 and the right eye 102. As illustrated in FIG. 7A, the gazing point is detected in a line-of-sight detection area of the display (the left display 106 and the right display 107). The gazing point detecting unit 114 notifies the processing control unit 116 of the detected gazing point. As described above, it is known that accuracy of detection of lines of sight of non-dominant eyes is not high. Hence, line-of-sight information on the dominant eye is used to detect the gazing point. According to the processing based on the gazing point, the gazing point of the dominant eye may be used as the gazing point of the non-dominant eye. Note that the HMD 100 may have a function of correcting (reducing) each of shake of the line of sight of the dominant eye (detection result; line-of-sight information) and shake of the line of sight of the non-dominant eye (detection result; line-of-sight information). In this case, the gazing point detecting unit 114 may detect the gazing point of the left eye 101 from the line-of-sight information on the left eye 101, and detect the gazing point of the right eye 102 from the line-of-sight information on the right eye 102. The gazing point of the left eye 101 is a position of the left display 106 that the left eye 101 is gazing at, and the gazing point of the right eye 102 is a position of the right display 107 that the right eye 102 is gazing at.

In step S104, the concentration degree detecting unit 115 detects (determines) the fluctuation amount of the user's line of sight based on at least the line-of-sight information on at least the non-dominant eye among the left eye 101 and the right eye 102, and detects (determines) the degree of user's concentration according to the fluctuation amount. The concentration degree detecting unit 115 notifies the processing control unit 116 of the detected degree of concentration. As described above, when the user is aimlessly looking at the target, the line of sight of the non-dominant eye relatively significantly fluctuates (shakes). Furthermore, in a case where, for example, the user performs work (of, for example, pushing a button icon) that requires depth information, that is, in a case where the user intensively looks at a target, the non-dominant eye also has a smaller fluctuation amount of the line of sight, and faces the direction of the target. Hence, the concentration degree detecting unit 115 detects the fluctuation amount (chronological fluctuation amount) of the line of sight based on the line-of-sight information on the non-dominant eye, and detects a lower degree of concentration as the fluctuation amount is larger (a higher degree of concentration as the fluctuation amount is smaller). As the degree of concentration, the concentration degree detecting unit 115 may detect a value that continuously changes in response to a change in the fluctuation amount, or may detect a value that changes stepwise in response to a change in the fluctuation amount using one or more thresholds. The concentration degree detecting unit 115 may detect the "low" degree of concentration when the fluctuation amount is the threshold or more, and detect the "high" degree of concentration when the fluctuation amount is less than the threshold such that one of the two states of the "low" and "high" degrees of concentration is detected. The fluctuation amount may be a magnitude of a variation from the gazing point detected by the gazing point detecting unit 114, or may not be this magnitude. For example, the fluctuation amount may be a magnitude (such as a standard deviation) of a variation from an average position of a line-of-sight position that changes over time.

Using different functions by causing the gazing point detecting unit 114 to estimate the gazing point from the line-of-sight information on the dominant eye and causing the concentration degree detecting unit 115 to estimate the degree of concentration from the line-of-sight information on the non-dominant eye is preferable from a viewpoint of reducing a load of arithmetic operation processing. However, when the fluctuation amount of the line of sight of the left eye 101 is substantially equal to the fluctuation amount of the line of sight of the right eye 102, that is, when it is difficult to determine the dominant eye/the non-dominant eye, the concentration degree detecting unit 115 may estimate the degree of concentration based on both of the fluctuation amount of the line of sight of the left eye 101 and the fluctuation amount of the line of sight of the right eye 102. For example, the concentration degree detecting unit 115 may estimate the degree of concentration according to an average of the fluctuation amount of the line of sight of the left eye 101 and the fluctuation amount of the line of sight of the right eye 102, or estimate the degree of concentration according to larger one of the fluctuation amount of the line of sight of the left eye 101 and the fluctuation amount of the line of sight of the right eye 102.

In step S105, the processing control unit 116 performs the processing that is based on the gazing point detected by the gazing point detecting unit 114. At this time, the processing control unit 116 controls the processing that is based on the gazing point, based on the degree of concentration (the fluctuation amount of the line of sight) detected by the concentration degree detecting unit 115.

In embodiment 1, the processing based on the gazing point is processing of applying a blurring effect to a video displayed on the display (the left display 106 and the right display 107), and thereby controlling (changing) the depth of field of a video using the gazing point as the reference. The blurring effect is applied by image processing such as filter processing. The processing control unit 116 controls, for example, an area to which the blurring effect is applied, and a level of the blurring effect based on the degree of concentration (the fluctuation amount of the line of sight) detected by the concentration degree detecting unit 115.

Here, a case is studied where the user's line of sight faces a direction of a certain target person and the user is intensively looking at the target person with an intention, that is, the degree of concentration detected by the concentration degree detecting unit 115 is high. In this case, the processing control unit 116 applies the blurring effect to the video such that display illustrated in FIG. 7A is shown. The display in FIG. 7A will be described. Clear display is kept in the area including the gazing point and surroundings of the gazing point, and other areas are applied the blurring effect and show unclear display. The area to which the blurring effect is applied and the area to which the blurring effect is not applied are marked by a blurring effect line.

Note that the size (diameter) of the blurring effect line, the number of blurring effect lines, and the level of the blurring effect are not limited in particular, and may be changed according to the degree of concentration. For example, a plurality of blurring effect lines may be set about the gazing point, and a stronger blurring effect may be applied to a plurality of areas marked by the plurality of blurring effect lines as the areas are more distant from the gazing point. Furthermore, when the gazing point captures a target person's face, a detection position of the gazing point may be changed to the center of an area including the face and the body of the target person or the like to apply the blurring effect to a video such that the depth of field whose reference is the changed gazing point becomes shallow.

Note that, as described above, a live video is displayed on the display at a time of transmissive equipment of the HMD 100. In this case, the diaphragm mechanism 126 and the focus mechanism 127 may be controlled to capture the live video (the live video having a shallow depth of field whose reference is the gazing point) to which the blurring effect has been applied. The focus mechanism 127 adjusts the focus to the gazing point, and the diaphragm mechanism 126 makes an aperture value smaller, so that it is possible to apply the blurring effect to the live video (it is possible to capture the live video having the shallow depth of field whose reference is the gazing point). Naturally, irrespectively of whether equipment of the HMD 100 is transmissive equipment or non-transmissive equipment, the blurring effect may be applied to a video by image processing.

It is known that, when people concentrate, a peripheral visual field area (also referred to as an effective visual field or the like) that plays a great role in recognition narrows. Hence, applying the blurring effect to a video using the gazing point as the reference when the degree of concentration is high does not prevent the user from concentrating. To the contrary, by applying the blurring effect to a video using the gazing point as the reference when the degree of concentration is high, it is possible to enhance a user's sense of immersion.

For example, a case where the user wants to check an entire video, that is, a case where the degree of concentration detected by the concentration degree detecting unit 115 is low will be studied. In this case, the user is unwilling to apply the blurring effect as in FIG. 7A. Hence, in this case, the processing control unit 116 stops applying the blurring effect to show display (clear display as a whole) as illustrated in FIG. 7B. The display in FIG. 7B meets needs of the user who wants to check the entire video, and is suitable display for the user.

As described above, according to embodiment 1, the gazing point is detected based on the line of sight of the dominant eye among the right eye and the left eye, and the processing based on the gazing point is controlled based on the fluctuation amount of the line of sight of at least the non-dominant eye among the right eye and the left eye. Consequently, it is possible to suitably perform processing that is based on the gazing point. More specifically, the processing control unit 116 makes the depth of field of a video whose reference is the gazing point shallower as the degree of concentration detected by the concentration degree detecting unit 115 is higher (as the fluctuation amount of the line of sight detected by the concentration degree detecting unit 115 is smaller). Consequently, it is possible to improve the user's sense of immersion and user friendliness.

Note that, although an example where the present invention is applied to the HMD has been described above, the present invention is applicable to all devices that achieve xR (such as Virtual Reality (VR), Augmented Reality (AR), Mixed Reality (MR), and Substitutional Reality (SR)) and the like. Furthermore, the present invention is also applicable to devices such as in-vehicle cameras, personal computers, tablet terminals, and smartphones that each include an imaging unit (camera), a display unit (display), and the like. The line-of-sight detecting device to which the present invention is applied may be a device separate from a camera, a display device, and the like.

Embodiment 2

Hereinafter, embodiment 2 of the present invention will be described with reference to FIG. 8. Note that description of the same points (such as configurations and processing) as those of embodiment 1 will be omitted, and differences from embodiment 1 will be described. The basic configuration and processing flow of an HMD according to embodiment 2 are the same as those of embodiment 1, and a function of the processing control unit 116 is different.

Figure 8:
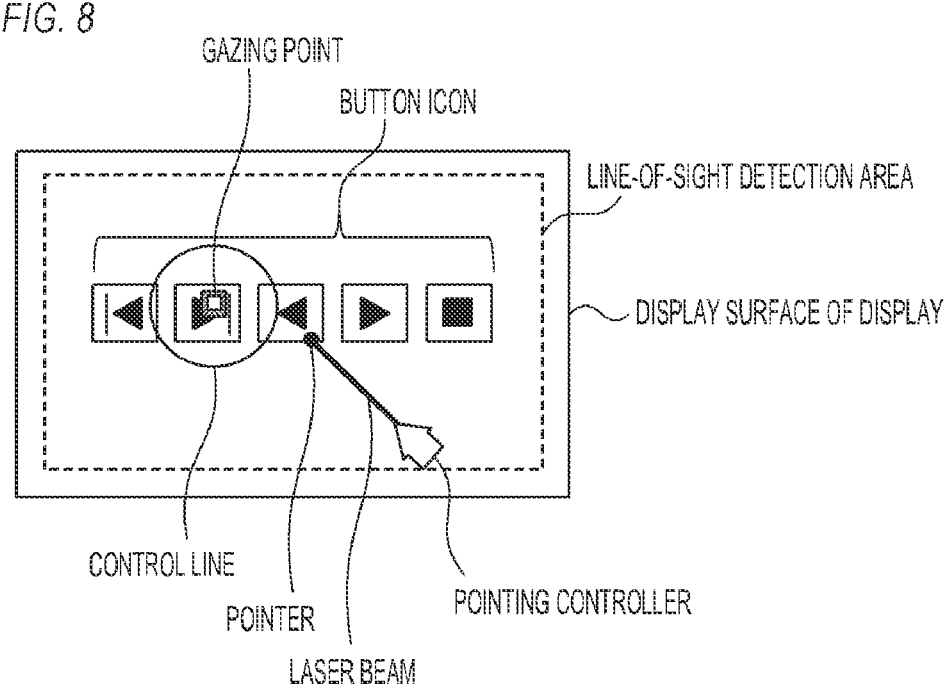
FIG. 8 is a view for describing gazing point processing according to embodiment 2.

Embodiment 2 assumes a case where each button icon that is a GUI displayed in a VR space is selected and clicked by a pointing controller as illustrated in FIG. 8. When, for example, the user moves the pointing controller by the hand, the virtual pointing controller displayed in the VR space also moves in conjunction with the movement of the pointing controller. The pointing controller in the VR space emits a laser beam from a distal end, and a pointer is displayed at a position at which the laser beam collides against the button icon. Clicking of the pointing controller is reflected in a button icon (the button icon pointed by the pointer) that the laser beam collides against. The pointer is a type of an item that can be moved according to a user's instruction.

When the pointer is adjusted to point to the button icon in the VR space using the pointing controller, there are problem that, for example, the pointer does not move to the target button icon, passes the button icon, and points to another button icon nearby. Hence, in embodiment 2, controllability of movement of the pointer is changed based on the degree of user's concentration to solve these problems.

The processing control unit 116 according to embodiment 2 makes movement resolution of the pointer near the gazing point higher as the degree of concentration detected by the concentration degree detecting unit 115 is higher (as the fluctuation amount of the line of sight detected by the concentration degree detecting unit 115 is smaller).

More specifically, when the degree of concentration detected by the concentration degree detecting unit 115 is high, the processing control unit 116 sets a control line whose reference is the gazing point as illustrated in FIG. 8. Furthermore, the processing control unit 116 controls the movement resolution of the pointer such that the pointer makes rough movement outside the control line seen from the gazing point, and makes fine movement inside the control line.

Note that the size (diameter) of the control line, the number of control lines, a value of the movement resolution in each area marked by the control line, and the like are not limited in particular, and may be changed according to the degree of concentration. Furthermore, when the gazing point captures an end of the button icon, a detection position of the gazing point may be changed to the center of the button icon or the like. Furthermore, the control line may be set using the changed gazing point as the reference such that, as the pointer is closer to the changed gazing point, the movement resolution of the pointer is higher.

When, for example, the user wants to select and click a button icon, that is, when the user wants to accurately point to the button icon with the pointer, the gazing point captures the desired button icon, and a high degree of concentration is detected. According to the above control, in such a case, it is possible to more roughly move the pointer as the pointer is more distant from the desired button icon, and more finely move the pointer as the pointer is closer to the desired button icon. As a result, it is possible to quickly and accurately adjust the pointer to point to the button icon.

When the degree of concentration detected by the concentration degree detecting unit 115 is low, the processing control unit 116 does not set the control line (cancels settings of the control line), and makes the movement resolution of the pointer uniform in an entire video. At this time, the processing control unit 116 sets lower movement resolution than the movement resolution near the gazing point in a case where the degree of concentration is high. By so doing, it is possible to suppress a moving speed of the pointer from slowing against a user's intention. Furthermore, it is possible to quickly move the pointer over an entire video. Furthermore, by deactivating the function of changing the movement resolution according to the position of the pointer, it is also possible to reduce a processing load of the CPU 128. Note that, when the degree of concentration is low, and when the movement resolution near the gazing point is lower than that in a case where the degree of concentration is high, the control line may be set such that, as the pointer is closer to the gazing point, the movement resolution is higher.

The processing control unit 116 may make the pointer attractable to the gazing point as the degree of concentration detected by the concentration degree detecting unit 115 is higher (as the fluctuation amount of the line of sight detected by the concentration degree detecting unit 115 is smaller). For example, the processing control unit 116 sets a longer distance (attraction distance) as the degree of concentration is higher, and attracts the pointer to the gazing point when the pointer is placed close to a range of the attraction distance from the gazing point. When the user is intensively looking at the button icon, if the pointer is moved close to a desired button icon, the pointer moves while being attracted to the desired button icon, so that a pointing adjustment speed and accuracy improve. Furthermore, pointing adjustment is easier as the degree of concentration is higher. Furthermore, when the degree of concentration is high, even if the hand that operates the pointer shakes, the pointer continues being attracted to the desired button icon without following shaking of the hand, so that it is easy to keep a pointing adjustment state, and it is possible to suppress an erroneous operation such as selection mistake. On the other hand, when the degree of concentration is low, it is possible to suppress the pointer from being attracted to the button icon against the user's intention. Note that, when the degree of concentration is low, the pointer may not be attracted to the gazing point.

The processing control unit 116 may make an influence of a change of the user's line of sight on the detection position of the gazing pointer smaller as the degree of concentration detected by the concentration degree detecting unit 115 is higher (as the fluctuation amount of the line of sight detected by the concentration degree detecting unit 115 is smaller). In other words, the processing control unit 116 may make the detection position of the gazing point more hardly change as the degree of concentration is higher. When, for example, the degree of concentration is high, the processing control unit 116 handles shaking of an eye (involuntary eye movement during fixation) against user's intention, and an instantaneous change of a line of sight as errors so as not to reflect in the detection position of the gazing point. Consequently, even when involuntary eye movement during fixation occurs or the line of sight instantaneously changes, it is possible to keep the detection position of the gazing point, and execute desired processing (processing as intended by the user) as processing that is based on the gazing point. On the other hand, when the degree of concentration is low, the processing control unit 116 reflects all changes of lines of sight including involuntary eye movement during fixation and instantaneous changes of the lines of sight in the detection position of the gazing point. Consequently, it is possible to quickly change the detection position of the gazing point. Note that, as the degree of concentration is higher, a current line-of-sight position may be synthesized with the detection position of the gazing point with a smaller weight to update the detection position of the gazing point.

Note that the above-described three types of control (control of movement resolution of the pointer, control of attraction of the pointer, and control of the detection position of the gazing point) may be executed in combination as appropriate. The above-described control may be combined with another control for adjusting the pointer to point to the gazing point.

As described above, it is possible to suitably perform the processing that is based on a gazing point in embodiment 2, too.

Note that, although the example where the present invention is applied to the HMD has been described above, the present invention is applicable to all devices that achieve xR (such as Virtual Reality (VR), Augmented Reality (AR), Mixed Reality (MR), and Substitutional Reality (SR)) and the like. Furthermore, the present invention is also applicable to devices such as in-vehicle cameras, personal computers, tablet terminals, and smartphones that each include an imaging unit (camera), a display unit (display), and the like. The line-of-sight detecting device to which the present invention is applied may be a device separate from a camera, a display device, and the like.

According to the present invention, it is possible to suitably perform processing that is based on a gazing point.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A line-of-sight detecting device comprising:
    a display;
    at least one memory; and
    at least one processor which function as:
        a line-of-sight detecting unit configured to detect each of lines of sight of a right eye and a left eye of a user;
        a gazing point detecting unit configured to detect a gazing point on a basis of the line of sight of a dominant eye among the right eye and the left eye; and
        a control unit configured to display an image on the display based on the gazing point detected by the gazing point detecting unit,
    wherein the control unit controls the image, which is displayed based on the gazing point on the display, in accordance with a fluctuation amount of the line of sight of a non-dominant eye among the right eye and the left eye such that, as the fluctuation amount of the line of sight of the non-dominant eye is smaller, a depth of field of the image shown to the user by the display is shallower.

2. The line-of-sight detecting device according to claim 1, wherein the fluctuation amount of the line of sight is a magnitude of a variation from the gazing point.

3. The line-of-sight detecting device according to claim 1, wherein, in a case where a fluctuation amount of the line of sight of the right eye is substantially equal to a fluctuation amount of the line of sight of the left eye, the control unit controls the processing based on the gazing point, on a basis of both of the fluctuation amount of the line of sight of the right eye and the fluctuation amount of the line of sight of the left eye.

4. A control method of a line-of-sight detecting device including a display, the control method comprising:
    detecting each of lines of sight of a right eye and a left eye of a user;
    detecting a gazing point on a basis of the line of sight of a dominant eye among the right eye and the left eye; and
    displaying an image on the display based on the detected gazing point,
    wherein the image, which is displayed based on the gazing point on the display, is controlled in accordance with a fluctuation amount of the line of sight of a non-dominant eye among the right eye and the left eye such that, as the fluctuation amount of the line of sight of the non-dominant eye is smaller, a depth of field of the image shown to the user by the display is shallower.

5. A non-transitory computer readable medium that stores a program, wherein the program causes a computer to execute a control method of a line-of-sight detecting device including a display, the control method comprising:
    detecting each of lines of sight of a right eye and a left eye of a user;
    detecting a gazing point on a basis of the line of sight of a dominant eye among the right eye and the left eye; and
    displaying an image on the display based on the detected gazing point,
    wherein the image, which is displayed based on the gazing point on the display, is controlled in accordance with a fluctuation amount of the line of sight of a non-dominant eye among the right eye and the left eye such that, as the fluctuation amount of the line of sight of the non-dominant eye is smaller, a depth of field of the image shown to the user by the display is shallower.

6. A line-of-sight detecting device comprising:
    a display;
    at least one memory; and
    at least one processor which function as:
        a line-of-sight detecting unit configured to detect each of lines of sight of a right eye and a left eye of a user;
        a gazing point detecting unit configured to detect a gazing point on a basis of the line of sight of a dominant eye among the right eye and the left eye;
        a determining unit configured to determine one of the right eye and the left eye as the dominant eye and determine another of the right eye and the left eye as the non-dominant eye on a basis of pre-registered information on the dominant eye and the non-dominant eye; and
        a control unit configured to display an image on the display based on the gazing point detected by the gazing point detecting unit,
    wherein the control unit controls the image, which is displayed based on the gazing point on the display, in accordance with a fluctuation amount of the line of sight of a non-dominant eye among the right eye and the left eye such that, as the fluctuation amount of the line of sight of the non-dominant eye is smaller, a depth of field of the image shown to the user by the display is shallower.

* * * * *